United States Patent
Yerram et al.

(10) Patent No.: US 11,643,966 B2
(45) Date of Patent: May 9, 2023

(54) SYSTEM AND METHOD FOR CONTROLLING LOW PRESSURE RECOUP AIR IN GAS TURBINE ENGINE

(71) Applicant: GENERAL ELECTRIC COMPANY, Schenectady, NY (US)

(72) Inventors: Ravinder Yerram, Sugar Land, TX (US); Venkata Satyanarayana Bandaru, Greer, SC (US); Balakrishnan Ponnuraj, Sugar Land, TX (US); Keith Fisher, Houston, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 113 days.

(21) Appl. No.: 17/400,337

(22) Filed: Aug. 12, 2021

(65) Prior Publication Data
US 2023/0046896 A1   Feb. 16, 2023

(51) Int. Cl.
*F02C 7/047* (2006.01)

(52) U.S. Cl.
CPC .......... *F02C 7/047* (2013.01); *F05D 2220/32* (2013.01); *F05D 2260/20* (2013.01); *F05D 2270/303* (2013.01)

(58) Field of Classification Search
CPC .......... F05D 2220/323; F05D 2260/20; F05D 2220/32; F05D 2270/303; F01D 25/14; F02C 7/08; F02C 9/18; F02C 6/08; F02C 7/047
See application file for complete search history.

(56) References Cited

U.S. PATENT DOCUMENTS

| | | | |
|---|---|---|---|
| 8,844,258 B2 * | 9/2014 | Ekanayake | F02C 7/047 60/39.093 |
| 2013/0005237 A1 | 1/2013 | Baten et al. | |
| 2013/0269355 A1 | 10/2013 | Wichmann et al. | |

(Continued)

FOREIGN PATENT DOCUMENTS

CN    113153527    7/2021

OTHER PUBLICATIONS

James DiCampli, P.E., et al.; Gas Turbine Air Filter System Optimization; Power Engineering; Jan. 1, 2015; https://www.power-eng.com/emissions/policy-regulations/gas-turbine-air-filter-system-optimization/#gref.

(Continued)

*Primary Examiner* — Todd E Manahan
*Assistant Examiner* — Rodolphe Andre Chabreyrie
(74) *Attorney, Agent, or Firm* — Grogan, Tuccillo & Vanderleeden, LLP

(57) ABSTRACT

Control of low pressure recoup air in a gas turbine engine disposed in a gas turbine enclosure with low pressure recoup air piping coupled to a gas turbine combustion exhaust and gas turbine engine enclosure is disclosed. A first valve of the piping controls a flow of the recoup air to the gas turbine combustion exhaust. A second valve of the piping diverts the recoup air to the enclosure for eventual flow to the air intake. A controller controls the flow of the recoup air from the piping to the exhaust and/or the enclosure as a function of ambient and air intake temperature measurements, and a predetermined temperature requirement having an ambient temperature constraint and an air intake temperature differential constraint.

20 Claims, 5 Drawing Sheets

(56) References Cited

U.S. PATENT DOCUMENTS

| | | | |
|---|---|---|---|
| 2014/0020394 A1 | 1/2014 | Laing et al. | |
| 2014/0230400 A1* | 8/2014 | Light | F01D 11/24 60/39.5 |
| 2015/0322866 A1* | 11/2015 | Scipio | F02C 9/18 415/1 |
| 2015/0345390 A1 | 12/2015 | Ekanayake et al. | |
| 2017/0335715 A1* | 11/2017 | Youssef | F02C 7/047 |
| 2017/0342902 A1 | 11/2017 | Scipio et al. | |
| 2021/0348564 A1* | 11/2021 | Mackin | B64D 33/02 |
| 2022/0195921 A1* | 6/2022 | Gomez | F02C 6/08 |

OTHER PUBLICATIONS

Extended European Search Report dated Jan. 13, 2023 from corresponding European Application No. 22187148.6.

* cited by examiner

SYSTEM AND METHOD FOR CONTROLLING LOW PRESSURE RECOUP AIR IN GAS TURBINE ENGINE

BACKGROUND

Technical Field

Embodiments of this disclosure relate generally to gas turbine systems, and more specifically, to a system and method for controlling low pressure recoup air in a gas turbine engine.

Discussion of Art

Gas turbine engines are utilized globally for electric power generation or as mechanical drives for operating equipment under a variety of climatic conditions. Operation during cold ambient temperature and high humidity conditions can lead to icing problems in gas turbine systems in which gas turbine engines are utilized. For example, ice can plug the filtration system of an air intake system to a gas turbine engine causing a significant drop in pressure in the air intake system, which in turn, leads to performance loss (e.g., gas turbine power output deterioration). In extreme cases, there is even a possibility that ice pieces can get ingested into a first blade stage of a compressor in the gas turbine engine, which can cause damage. Ice may also cause the disruption of compressor work because of excessive vibration, or surging by decreasing the inlet flow. Consequently, gas turbine systems that are located in areas where icing conditions can exist are typically equipped with an anti-icing system that can heat the intake air before it enters the compressor of the gas turbine engine.

BRIEF DESCRIPTION

The following presents a simplified summary of the disclosed subject matter in order to provide a basic understanding of some aspects of the various embodiments described herein. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

The various embodiments of the present invention are directed to providing a novel and nonobvious anti-icing approach for use with a gas turbine system utilizing a gas turbine engine. The solution provided by the various embodiments includes using low pressure recoup air vented from the gas turbine engine to aid in heating the air at the inlet of the air intake system to the gas turbine engine during icing conditions, or to aid in heating a gas turbine enclosure that encloses the gas turbine engine during colder ambient conditions. In particular, low pressure recoup air piping is operatively coupled to the gas turbine engine to carry the low pressure recoup air from the gas turbine engine to a gas turbine combustion exhaust that outputs an exhaust flow from the gas turbine engine to outside of the gas turbine enclosure. A first valve and a second valve are operatively coupled to the low pressure recoup air piping. The first valve can control a flow of the low pressure recoup air to the gas turbine combustion exhaust, while the second valve can divert the flow of the low pressure recoup air from the low pressure recoup air piping to the gas turbine enclosure.

A controller is operatively coupled to the first valve and the second valve, and configured to automatically control the flow of the low pressure recoup air from the low pressure recoup air piping to the gas turbine combustion exhaust and/or the gas turbine enclosure and the air intake system. The controller comprises control logic that enables the controller to use the low pressure recoup air that is diverted from the low pressure recoup air piping to the gas turbine enclosure to aid in heating the air at the inlet of the air intake system along with air provided at the inlet by a gas turbine enclosure ventilation exhaust system that is operatively coupled to the air intake system, the gas turbine engine, and the gas turbine enclosure, to purge and ventilate heat and exhaust products from the gas turbine engine. In this manner, the control logic of the controller can be used for purposes of preventing icing in the air intake system. In addition, the control logic of the controller can use the low pressure recoup air that is diverted from the low pressure recoup air piping to heat the gas turbine enclosure in colder ambient conditions.

In one embodiment, the controller can obtain a first temperature measurement representative of ambient temperature about the air intake system, and a second temperature measurement obtained within the air intake system. The logic of the controller enables the controller to control the flow of the low pressure recoup air in the low pressure recoup air piping to the gas turbine combustion exhaust and/or gas turbine enclosure and the air intake system as a function of the ambient temperature measurement, the air intake system temperature measurement, and a predetermined temperature requirement having an ambient temperature constraint and an air intake system temperature differential constraint. In particular, the controller can control the flow of the low pressure recoup air from the low pressure recoup air piping to the gas turbine combustion exhaust and/or the gas turbine enclosure and the air intake system based on values of the ambient temperature measurement and the air intake system temperature measurement in relation to the ambient temperature constraint and the air intake system temperature differential constraint.

In one embodiment, the ambient temperature constraint comprises an ambient temperature that is less than about 40 degrees F., and the air intake system temperature differential constraint comprises a temperature difference between 40 degrees F. and the air intake system temperature measurement, or a 10 degree F. increase or rise from the air intake system temperature measurement, whichever is lower. In one scenario, if the air intake system temperature measurement is greater than about 40 degrees F., then the controller can direct the first valve to be 100% open and the second valve to be 0% open (i.e., closed). To this extent, the low pressure recoup air piping will direct all of the flow of the low pressure recoup air to the gas turbine combustion exhaust. In addition, with these conditions, the controller will direct the gas turbine enclosure ventilation exhaust system to position a ventilation air control damper to move 100% of the ventilation exhaust air from the gas turbine enclosure to ambient.

If the air intake system temperature measurement is less than about 40 degrees F., then the controller will direct the gas turbine enclosure ventilation exhaust system to modulate or gradually position the ventilation air control damper to move a 100% of the ventilation exhaust air from the gas turbine enclosure to the air intake system via air inlet heating ducts in fluid communication with an air filter house of the air intake system. The controller can then monitor the effect that moving 100% of the gas turbine enclosure ventilation exhaust air to the air intake system by obtaining additional ambient temperature measurements about the air intake system and temperature measurements within the air intake system. In particular, the control logic of the controller will compare these temperature measurements to the temperature constraint and the air intake system temperature differential constraint of the predetermined temperature requirement. If the air intake system temperature differential constraint still has not been met, then the controller can modulate or gradually open the second valve associated with the low pressure recoup air piping to be 100% open in order to divert a portion of the flow of the low pressure recoup air to the gas turbine enclosure. To this extent, the gas turbine enclosure ventilation exhaust system can use the ventilation exhaust air from the gas turbine enclosure that will include the diverted low pressure recoup air and direct it to the air filter house of the air intake system via the air inlet heating ducts. The heat from the gas turbine enclosure ventilation exhaust air and the low pressure recoup air will heat the ambient air entering into the air intake system via the air filter housing.

The controller can then receive additional ambient temperature measurements about the air intake system and temperature measurements within the air intake system to determine if opening the second valve resulted in the air intake system temperature differential constraint being met. If the objective of the air intake system temperature differential constraint still has not been met, then the controller will modulate the first valve until it is fully closed, resulting in all of the flow of the low pressure recoup air being diverted from the low pressure recoup air piping to the gas turbine enclosure. The controller can then maintain the positioning of the ventilation air control damper, the first valve and the second valve until the objective of the air intake system temperature differential constraint is met. Once the air intake system temperature differential constraint is met, the controller can maintain the ventilation air control damper and the valves at the positions that achieved the objective.

The controller can then continue to monitor the ambient temperature about the air intake system and the temperature within the air intake system by obtaining further measurements. When the controller senses improvement in the ambient temperature about the air intake system, the controller is configured to direct the ventilation air control damper, the first valve and the second valve to slowly revert back to their original designated positions for instances in which the ambient temperature is greater than about 40 degrees F. (i.e., the ventilation air control damper sends 100% of the gas turbine enclosure ventilation exhaust air to ambient, the first valve is 100% open to direct the low pressure recoup air to the gas turbine combustion exhaust, and the second valve is 0% open (closed) such that none of the low pressure recoup air is diverted.

With this configuration and operation of the low pressure recoup air piping, the first valve and the second valve, and the control logic, the various embodiments can control the low pressure recoup air vented from the gas turbine engine dependent upon temperature conditions about the gas turbine engine. This is advantageous for gas turbine engines that are situated in cold weather locations that are subject to icing conditions. To this extent, the approach provided by the various embodiments can be used as part of an anti-icing system. In particular, the low pressure recoup air diverted from the low pressure recoup piping can complement the gas turbine enclosure ventilation exhaust air provided to the air intake system in response to the existence of temperatures in which icing can occur. In this manner, the heat from the gas turbine enclosure ventilation exhaust air and/or the diverted low pressure recoup air can heat the air intake system to a temperature that satisfies a predetermined temperature requirement that fulfills an anti-icing objective. If icing conditions are not an issue, but the temperatures are still considered to be cold ambient conditions (e.g., approaching 40 degrees F.), the diverted low pressure recoup air can be used to heat the gas turbine enclosure. When the icing and cold ambient conditions are not an issue, the low pressure recoup piping can direct the low pressure recoup air to the gas turbine combustion exhaust, and the gas turbine enclosure ventilation exhaust air can be directed to ambient.

In accordance with one embodiment, a system for controlling low pressure recoup air vented from a gas turbine engine disposed in a gas turbine enclosure with low pressure recoup air piping coupled to a gas turbine combustion exhaust located outside of the enclosure and an air intake system to provide air to the gas turbine engine for combustion is provided. The system comprises: a first valve operatively coupled to the low pressure recoup air piping to control a flow of the low pressure recoup air to the gas turbine combustion exhaust; a second valve operatively coupled to the low pressure recoup air piping for diverting the low pressure recoup air to the gas turbine enclosure; and a controller operatively coupled to the first valve and the second valve to automatically control the flow of the low pressure recoup air from the low pressure recoup air piping to the gas turbine combustion exhaust and/or the gas turbine enclosure as a function of a first temperature measurement representative of ambient temperature about the air intake system, a second temperature measurement obtained within the air intake system, and a predetermined temperature requirement having an ambient temperature constraint and an air intake system temperature differential constraint.

In accordance with another embodiment, a system is provided. The system comprises: a gas turbine enclosure; a gas turbine engine disposed in the gas turbine enclosure; an air intake system operatively coupled to the gas turbine enclosure to direct air to the gas turbine engine, wherein the air intake system includes an air filter house to filter the air directed to the gas turbine engine; a gas turbine combustion exhaust operatively coupled to the gas turbine engine to output an exhaust flow generated from the gas turbine engine outside of the gas turbine enclosure; low pressure recoup air piping operatively coupled to the gas turbine engine, the gas turbine enclosure and the gas turbine combustion exhaust to provide low pressure recoup air vented from the gas turbine engine to the gas turbine combustion exhaust and/or the gas turbine enclosure; a first valve operatively coupled to the low pressure recoup air piping to control a flow of the low pressure recoup air to the gas turbine combustion exhaust; a second valve operatively coupled to the low pressure recoup air piping for diverting the low pressure recoup air from the low pressure recoup air piping to the gas turbine enclosure; and a controller operatively coupled to the first valve and the second valve to control the flow of the low pressure recoup air from the low pressure recoup air piping to the gas turbine combustion exhaust and/or the gas turbine enclosure, wherein the controller includes control logic configured to control the flow of the low pressure recoup air as a function of an ambient temperature measurement obtained about the air intake system, an air intake system temperature measurement obtained within the air intake system, and a predetermined temperature requirement having an ambient temperature constraint and an air intake system temperature differential constraint, wherein the control logic is configured to control the flow of the low pressure recoup air from the low pressure recoup air piping to the gas turbine combustion exhaust and/or the gas turbine enclosure based on values of the ambient temperature measurement and the air intake system temperature measurement in relation to satisfying the ambient temperature constraint and the combustion air intake system temperature differential constraint.

In accordance with third embodiment, a method for controlling low pressure recoup air vented from a gas turbine engine disposed in a gas turbine enclosure with low pressure recoup air piping coupled to a gas turbine combustion exhaust located outside of the enclosure, an air intake system to provide air to the gas turbine engine for combustion, and a gas turbine enclosure ventilation exhaust system to purge and ventilate heat and exhaust products from the gas turbine engine is provided. The method comprises: configuring a first valve to operate cooperatively with the low pressure recoup air piping to control a flow of the low pressure recoup air to the gas turbine combustion exhaust; configuring a second valve to operate cooperatively with the low pressure recoup air piping for diverting the low pressure recoup air from the low pressure recoup air piping to the gas turbine enclosure; obtaining an ambient temperature measurement about the air intake system; obtaining an air intake system temperature measurement from within the air intake system; and controlling the flow of the low pressure recoup air from the low pressure recoup air piping to the gas turbine combustion exhaust and/or the gas turbine enclosure as a function of the ambient temperature measurement, the air intake temperature measurement, and a predetermined temperature requirement having an ambient temperature constraint and an air intake temperature differential constraint, wherein the controlling of the flow of the low pressure recoup air from the low pressure recoup air piping to the gas turbine combustion exhaust and/or the gas turbine enclosure is based on values of the ambient temperature measurement and the air intake system temperature measurement in relation to satisfying the ambient temperature constraint and the gas turbine engine temperature differential constraint.

DRAWINGS

The present invention will be better understood from reading the following description of non-limiting embodiments, with reference to the attached drawings, wherein below:

Figure 2:
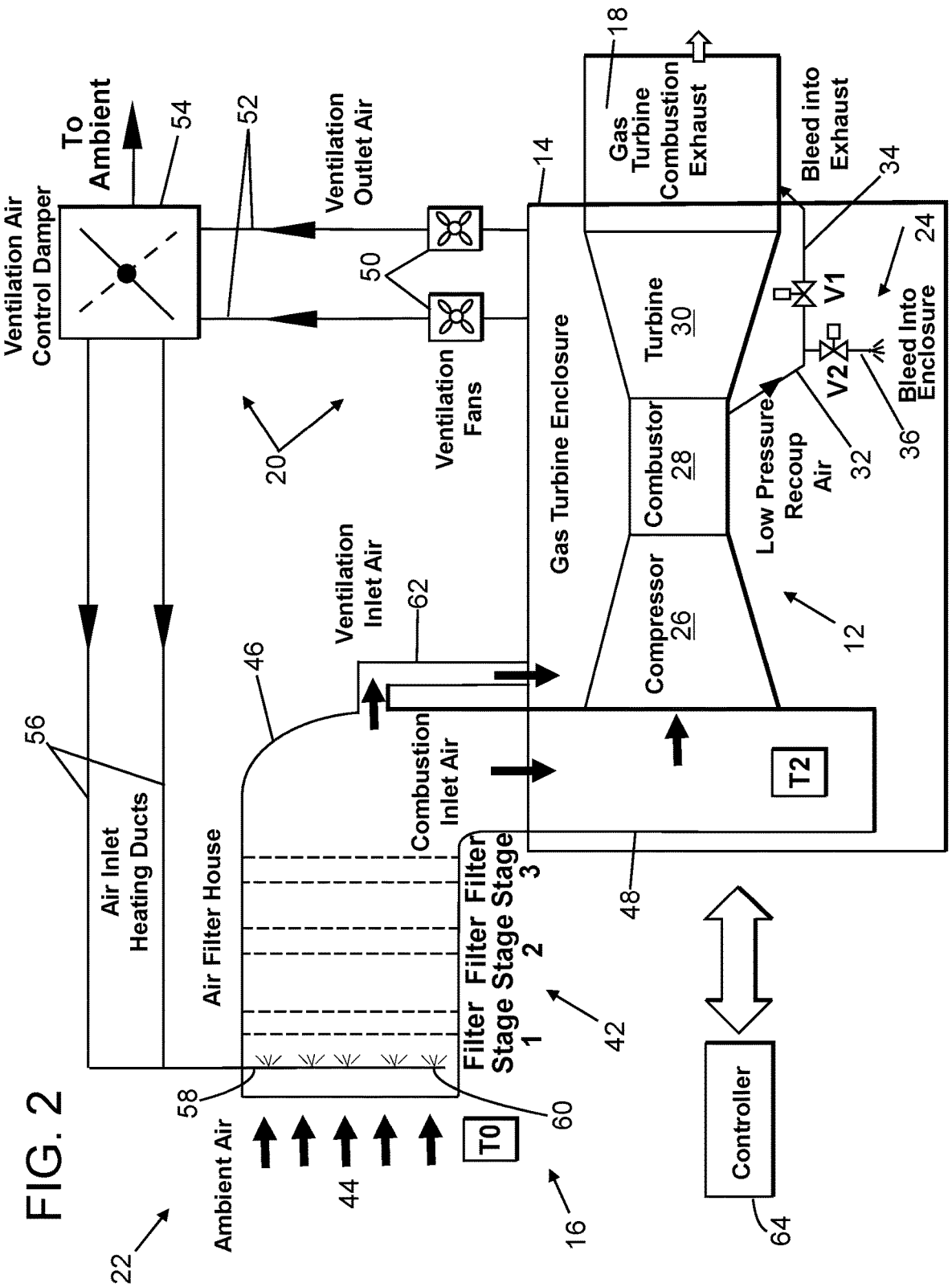
FIG. 2 shows a schematic of a system for controlling low pressure recoup air vented from a gas turbine engine disposed in a gas turbine enclosure with low pressure recoup air piping coupled to a gas turbine combustion exhaust according to an embodiment of the invention.
Figure 4:
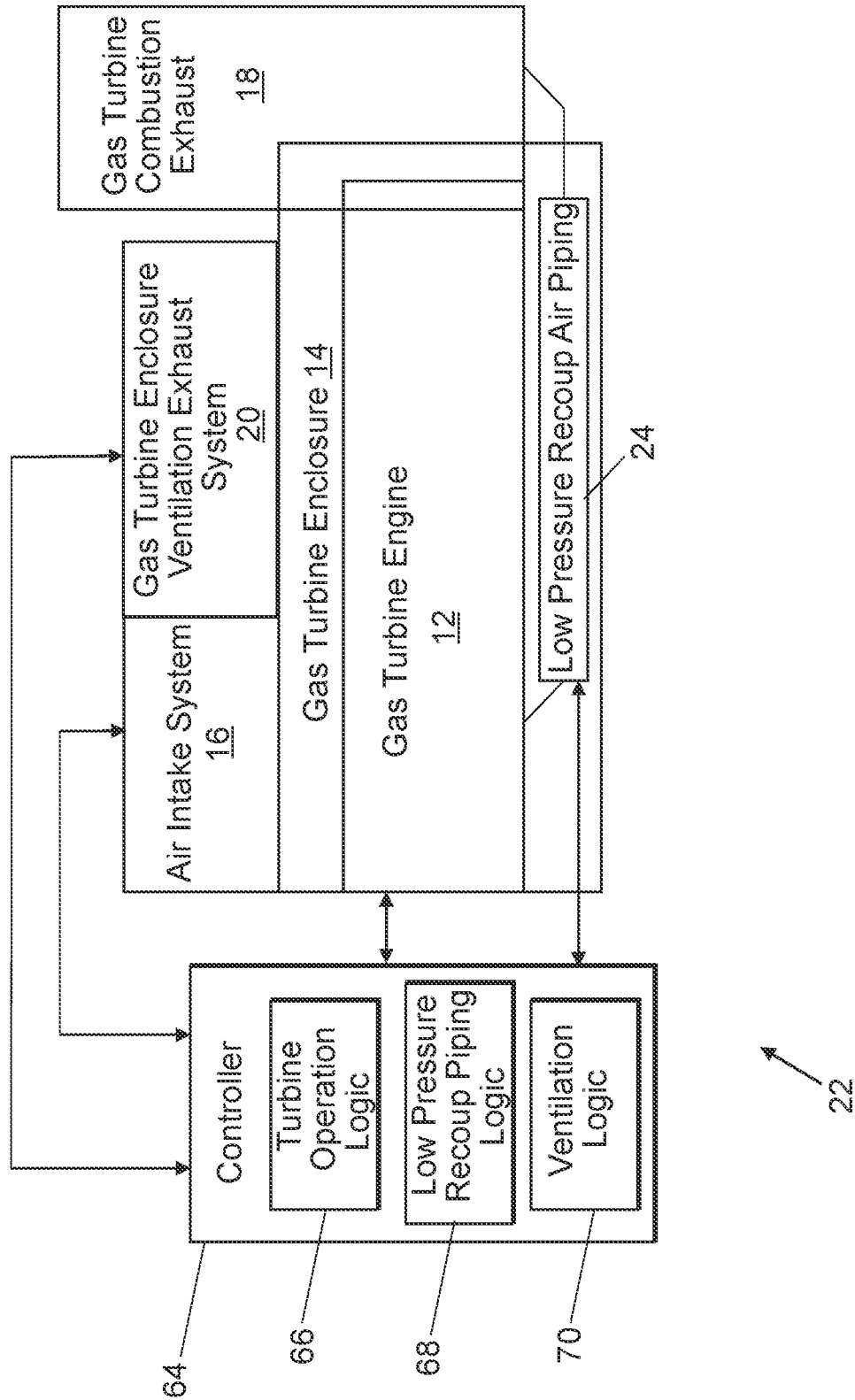
Figure 5:
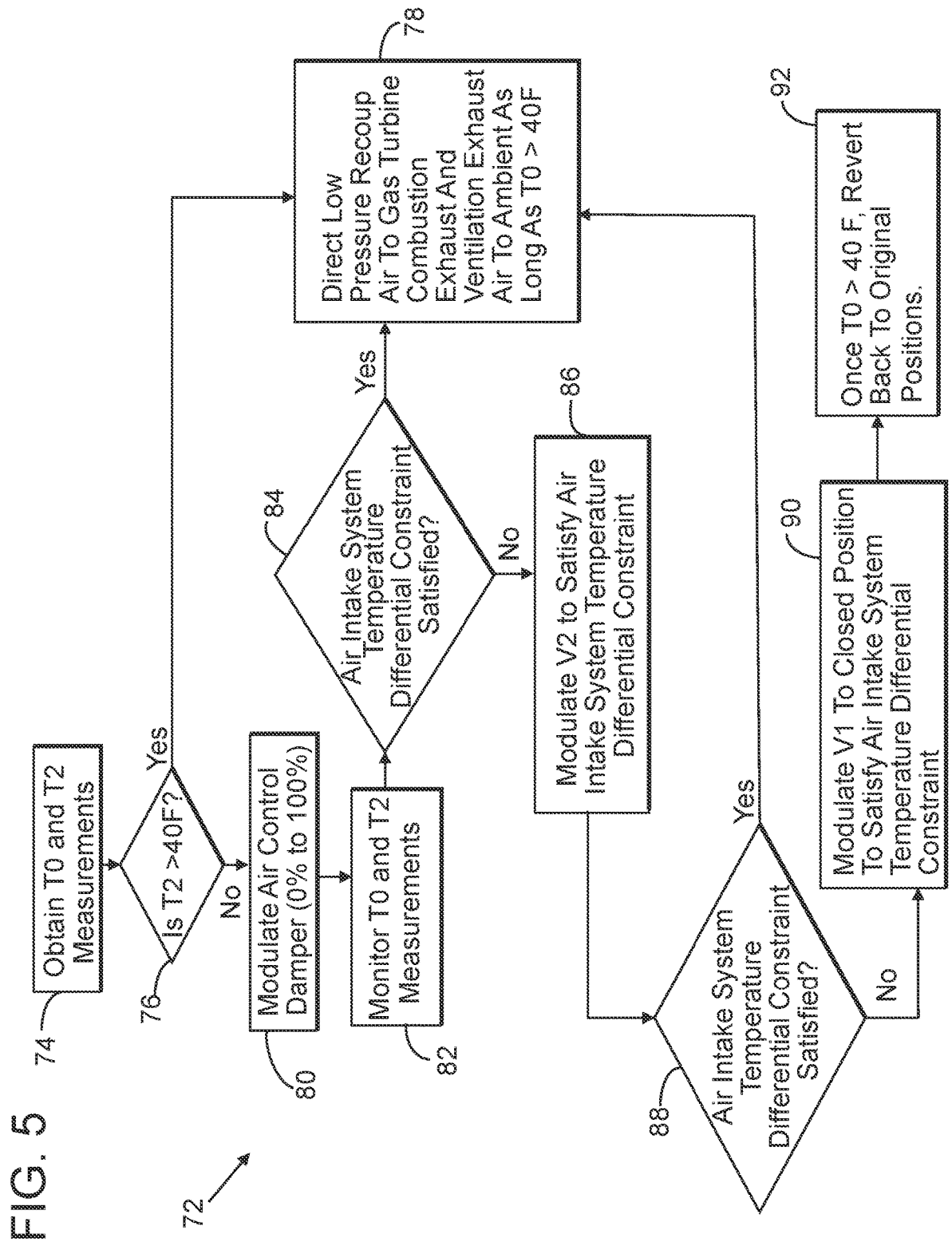

FIG. 4 shows a schematic block diagram of the system depicted in FIG. 2 with further details of the control logic of the controller that can control the low pressure recoup air vented from the gas turbine engine by the low pressure recoup air piping according to an embodiment of the invention; and FIG. 5 shows a flow chart describing the operations associated with the control logic of the controller depicted in FIG. 4 for controlling the flow of the low pressure recoup air from the low pressure recoup air piping to the gas turbine combustion exhaust and/or to the gas turbine enclosure for eventual heating of the gas turbine enclosure and/or an air intake system depicted in FIG. 2 according to an embodiment of the invention.

DETAILED DESCRIPTION

Example embodiments of the present invention will be described more fully hereinafter with reference to the accompanying drawings, in which some, but not all embodiments are shown. Indeed, the present invention may be embodied in many different forms and should not be construed as limited to the embodiments set forth herein; rather, these embodiments are provided so that this disclosure will satisfy applicable legal requirements. For like numbers may refer to like elements throughout.

This disclosure relates generally to gas turbine systems, and more specifically, to a system and method for controlling low pressure recoup air in a gas turbine engine of an aeroderivative gas turbine system. Low pressure recoup air as used herein is the airflow that develops in an inner insulating chamber of a gas turbine engine bearing sump that houses a bearing(s) that supports a shaft of the engine at a particular location about the gas turbine engine (i.e., the compressor rear frame that provides mid support for the shaft and mounts and positions the combustor of the gas turbine engine). In particular, a gas turbine engine bearing sump about the compressor rear frame can have two insulating chambers (i.e., an outer insulating chamber and an inner insulating chamber) that protect lube oil of the sump from the heat of the main path gas.

The outer insulating chamber and the inner insulating chamber are isolated from the high pressure compressor of the gas turbine engine by compressor discharge pressure (CDP) and vent labyrinth seals. The seals serve to form the outer insulating chamber and the inner insulating chamber into a high pressure recoup air chamber and a low pressure recoup air chamber, respectively. The high pressure recoup airflow in the high pressure recoup air chamber results from compressor discharge air leaking across the CDP seal, while the low pressure recoup airflow in the low pressure recoup air chamber develops from the high pressure recoup air leaking across the vent seal.

The low pressure recoup air can be bled overboard from the compressor rear frame struts, collected, and controlled according to any of the various embodiments. For example, as disclosed below in more detail, the low pressure recoup air can be directed to the gas turbine combustion exhaust, used to aid in heating the air at the inlet of the air intake system to the gas turbine engine during icing conditions, or to aid in heating a gas turbine enclosure that encloses the gas turbine engine during colder ambient conditions.

Figure 1:
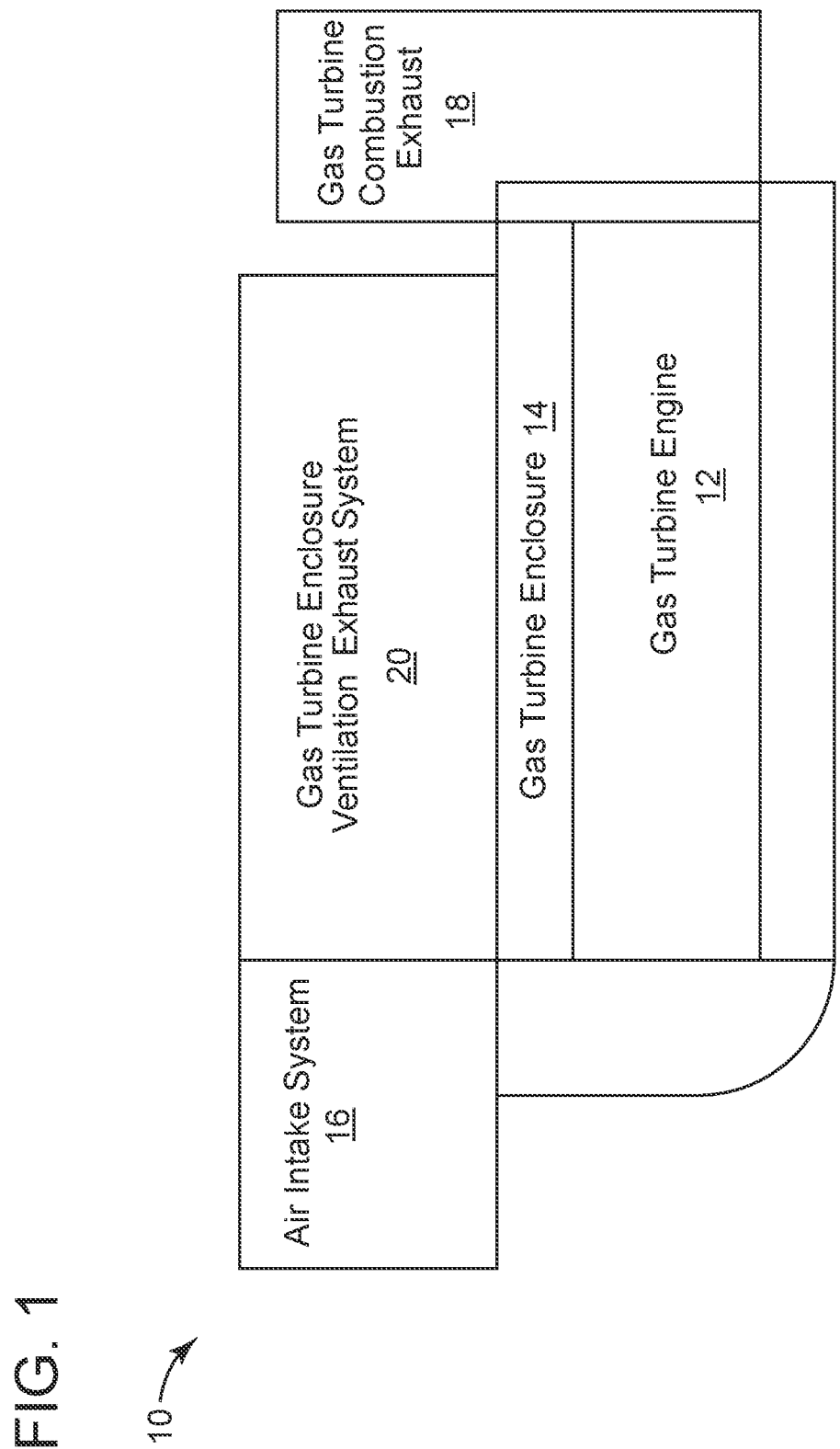
FIG. 1 shows a schematic of a gas turbine system according to an embodiment of the invention.

Turning now to the figures, FIG. 1 shows a schematic of a gas turbine system 10. As shown in FIG. 1, the gas turbine system 10 includes a gas turbine engine 12, a gas turbine enclosure 14 that houses the gas turbine engine 12, an air intake system 16 that provides filtered air to the gas turbine engine 12 for combustion, a gas turbine combustion exhaust 18 for releasing exhaust gases from the gas turbine engine 12, and a gas turbine enclosure ventilation exhaust system 20 to purge and ventilate heat and exhaust products from the gas turbine engine 12.

The gas turbine engine 12 can include a compressor, a combustor, and a turbine. In general, the compressor can compress an incoming flow of air. The compressor can deliver the compressed flow of air to the combustor, where the compressed flow of air mixes with a compressed flow of fuel. The combustor can ignite the air/fuel mixture to create a flow of combustion gases. The flow of combustion gases can be delivered to the turbine to drive the turbine to produce mechanical work. The mechanical work produced in the turbine can drive the compressor and an external load, such as an electrical generator or the like. The flow of combustion gases may be exhausted or otherwise disposed by the gas turbine combustion exhaust 18.

The gas turbine engine 12 can use natural gas, various types of syngas, and/or other types of fuels. In addition, the gas turbine engine 12 may be any one of a number of different gas turbine engines such as those offered by the General Electric Company. For example, the gas turbine engine 12 can include an aeroderivative gas turbine.

The gas turbine enclosure 14, which encloses the gas turbine engine 12, can isolate the gas turbine engine 12. In addition, the gas turbine enclosure 14 can include a number of different components that operate in conjunction with the gas turbine 12. For example, the gas turbine enclosure 14 can include piping for lube oil, NOx emissions, power augmentation, and the like. Other components can include, but are not limited to, a gas detection system and a fire detection and suppression system. Also, the gas turbine enclosure 14 can perform a number of different functions that contribute to the operation of the gas turbine engine 12. For example, the gas turbine enclosure 14 can serve as a sump for oil leaks from the gas turbine engine 12.

The air intake system 16 can include an inlet screen or an air filter house that includes one or more filter assemblies having a number of inlet air filters that remove moisture and/or particulate matter (such as dust, dirt, contaminants and/or debris) from intake air channeled for supply to the gas turbine engine 12. A clean air duct can receive the filtered air from the air filter house. The air in the clean air duct is divided into combustion inlet air that goes to the compressor of the gas turbine engine 12, and ventilation inlet air that is supplied to the gas turbine enclosure 14. In particular, a combustion inlet air duct can provide the combustion inlet air to the compressor, while a ventilation inlet air bypass conduit can supply the ventilation inlet air to the gas turbine enclosure 14.

The gas turbine enclosure ventilation exhaust system 20 can include one or more ventilation fans that operate to generate an air flow to purge the gas turbine enclosure 14 of heat and exhaust products from the gas turbine engine 12. In addition, the gas turbine enclosure ventilation exhaust system 20 can include a damper that controls the flow of air containing the heat and exhaust products from the gas turbine engine 12 and the gas turbine enclosure 14. In particular, the damper can direct the gas turbine enclosure ventilation exhaust air to the air intake system 16 and/or venting to ambient.

It is understood that the gas turbine system 10 can include a number of other components not depicted in FIG. 1. For example, the gas turbine system 10 can include a shaft operatively coupled to the compressor and gas turbine of the gas turbine engine 12. To this extent, the shaft may be connected to an electrical generator for power generation applications.

FIG. 2 shows a schematic of a system 22 for controlling low pressure recoup air vented from the gas turbine engine 12 disposed in the gas turbine enclosure 14 with low pressure recoup air piping 24 coupled to the gas turbine combustion exhaust 18. As shown in FIG. 2, and discussed above with respect to FIG. 1, the gas turbine engine 12 is disposed in the gas turbine enclosure 14. The gas turbine engine 12 includes a compressor 26, a combustor 28, and a turbine 30. To this extent, the compressor 26 can compress the air received from the air intake system 16. The combustor 28 receives a mix of the compressed air from the compressor 26 with fuel for combustion thereof. For example, one or more fuel nozzles can intake and mix the fuel with the compressed air from the compressor 26 and distribute the air-fuel mixture into the combustor 28 in a suitable ratio for combustion. The air-fuel mixture combusts in a chamber within the combustor 28 to create hot pressurized exhaust gases. The exhaust gases from the combustor 28 can be directed towards the turbine 30.

As the exhaust gases pass through the turbine 30, the gases force turbine blades to rotate a shaft along an axis of the gas turbine engine 12. The shaft can be connected to various components of the gas turbine engine 12, including the compressor 26. The compressor 26 also includes blades coupled to the shaft. To this extent, as the shaft rotates, the blades within the compressor 26 also rotate, thereby compressing the air intake from the air intake system 16 through the compressor 26 and into the fuel nozzles and the combustor 28. The shaft may also be connected to a load, such as an electrical generator. In this manner, the mechanical work in the turbine 30 can drive the electrical generator to produce power.

The low pressure recoup air piping 24 can capture and reroute the low pressure recoup air from the gas turbine engine 12. In one embodiment, as shown in FIG. 2, the low pressure recoup air piping 24 is in fluid communication with the compressor 26, the gas turbine combustion exhaust 18, which vents the exhaust gases from the turbine 30, and the gas turbine enclosure 14 in which the gas turbine engine 12 is disposed. As used herein, the term "in fluid communication" means that there is a passage that allows a fluid to flow. In this manner, the low pressure recoup air piping 24 can direct the low pressure recoup air towards the gas turbine combustion exhaust 18 and/or into the gas turbine enclosure 14. In particular, in operation, the low pressure recoup air piping 24 can bleed the low pressure recoup air into the gas turbine combustion exhaust 18 and/or into the gas turbine enclosure 14.

Figure 3:
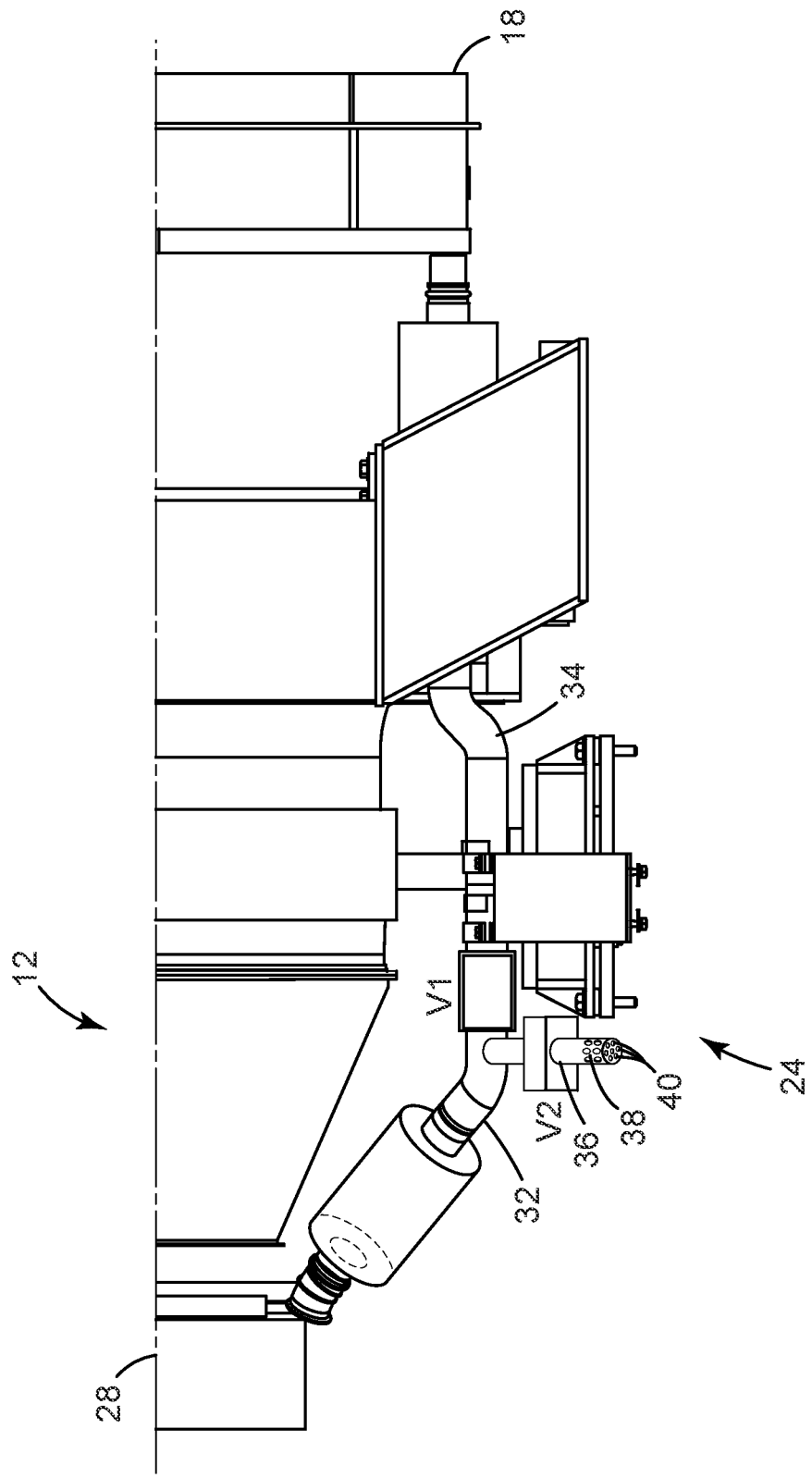
FIG. 3 shows a schematic of a more detailed view of the low pressure recoup air piping depicted in FIG. 2 according to an embodiment of the invention.

As shown in FIGS. 2 and 3, the low pressure recoup air piping 24 can include a first valve V1 operatively coupled to the low pressure recoup air piping 24 to control a flow of the low pressure recoup air from the gas turbine engine 12 to the gas turbine combustion exhaust 18. The low pressure recoup air piping 24 can further include a second valve V2 operatively coupled to the low pressure recoup air piping 24 for diverting the low pressure recoup air to the gas turbine enclosure. The first valve V1 and the second valve V2 can include any one of number of flow control valves. For example, the first valve V1 and the second valve V2 can include electronic flow control values. In one embodiment, the first valve V1 and the second valve V2 can include solenoid operated valves.

The low pressure recoup air piping 24 can further include the respective piping to carry the low pressure recoup air from the gas turbine engine 12 into the gas turbine combustion exhaust 18 and the gas turbine enclosure 14. As shown in FIGS. 2 and 3, the low pressure recoup air piping 24 can include a low pressure recoup air conduit 32, a gas turbine combustion exhaust low pressure recoup air conduit 34, and a gas turbine enclosure low pressure recoup air conduit 36. In this manner, the low pressure recoup air piping 32 is in fluid communication with the gas turbine engine 12 (e.g., the compressor 26) and the first valve V1 and the second valve V2. The gas turbine combustion exhaust low pressure recoup air conduit 34 is in fluid communication with the gas turbine combustion exhaust 18 and the first valve V1. The gas turbine enclosure low pressure recoup air conduit 36 is in fluid communication with the gas turbine enclosure 14 and the second valve V2. With this configuration, the low pressure recoup air conduit 32 can carry the low pressure recoup air towards the first valve V1 and the second valve V2, the gas turbine combustion exhaust low pressure recoup air conduit 34 can carry the low pressure recoup air from the first valve V1 towards the gas turbine combustion exhaust 18, while the gas turbine enclosure low pressure recoup air conduit 36 can carry the low pressure recoup air from the second valve V2 towards the gas turbine enclosure 14.

In one embodiment, as shown in FIG. 3, the gas turbine enclosure low pressure recoup air conduit 36 can be configured as a low pressure recoup air dispersion nozzle 38 with a multitude of dispersion holes 40 to deliver the low pressure recoup air into the gas turbine enclosure 14. In this manner, the low pressure recoup air dispersion nozzle 38 with the multitude of dispersion holes 40 can deliver the low pressure recoup air into the gas turbine enclosure 14 in a broad, diverse pattern that precludes splashing of the low pressure recoup air at high velocities. In addition to avoiding splashing of the low pressure recoup air at high velocities, the low pressure recoup air dispersion nozzle 38 with the multitude of dispersion holes 40 serves to smoothly distribute or mix the low pressure recoup air in the gas turbine enclosure 14.

Referring back now to only FIG. 2, the air intake system 16 can include an air filter house 42 that removes moisture and/or particulate matter (such as dust and/or debris) from intake air 44 channeled to the gas turbine engine 12. In one embodiment, the air filter house 42 can include a multiple of filter stages (e.g., Filter Stage 1, Filter Stage 2, Filter Stage 3) to filter the intake air 44 provided to the gas turbine engine 12. As shown in FIG. 2, the filter stages can be disposed in series in the air filter house 42 such that Filter Stage 1 applies a first filter to the intake air 44, while Filter Stage 2, which is downstream of Filter Stage 1, and Filter Stage 3, which is downstream of Filter Stage 2, each applies an additional filtering of the intake air 44 to further remove any moisture and/or particulate matter that may remain after filtering in the filter stage upstream therefrom. As used herein, "downstream" and "upstream" are terms that indicate a direction relative to the flow of a fluid, such as the working fluid through the gas turbine system, for example, the flow of air through the air intake system or through one of the components of a gas turbine engine. The term "downstream" corresponds to the direction of flow of the fluid, and the term "upstream" refers to the direction opposite to the flow.

It is understood that the number of filter stages (Filter Stage 1, Filter Stage 2, Filter Stage 3) depicted in PG. 2 are illustrative of a number of filter stages that may be deployed in the air filter house 42, and is not meant to be limiting. Those skilled in the art will appreciate that the air filter house 42 can have more or less filter stages than that what is depicted in FIG. 2.

Each of the filter stages in the air filter house 42 can include any suitable filtering component that may be configured to remove and/or filter out large and small particles and/or debris that may be found in the intake air 44, such as, sand grains, dirt, rain drops, snow, and other undesirable debris. In one embodiment, each of the filter stages in the air filter house 42 can include an array of fabric filters (e.g., fabric filter bags, conical fabric filters, pulse fabric filters, static fabric filters, and the like) that can filter finer and/or smaller particulates from the intake air 44 flowing therethrough.

It is understood that the air filter house 42 can be configured to include other filtering components and is not meant to be limited to the use of fabric filters in the various filter stages. For example, the air filter house 42 can include vane filters (e.g., weather hoods and/or screens) to remove and/or filter out large particles and/or debris that may be found in the intake air 44. For example, in one embodiment, the air filter house 42 can be configured with vane filters formed at an inlet that receives the intake air 44 to remove and/or filter out large particles and/or debris, while the Filter Stages 1, 2 and 3 can filter out the smaller or finer particles that remain in the intake air 44.

The air intake system 16 further includes a clear air duct 46 in fluid communication with the air filter house 42. In one embodiment, the clean air duct 46 can receive the filtered air from the air filter house 42. The air in the clean air duct 46 is then divided into combustion inlet air that goes to the compressor 26 of the gas turbine engine 12, and ventilation inlet air that is supplied to the gas turbine enclosure 14. In one embodiment, a combustion inlet air duct 48, that is in fluid communication with the clean air duct 46, provides the combustion inlet air to the compressor 26 of the gas turbine engine 12, while a ventilation inlet air bypass conduit 62, that is in fluid communication with the clean air duct 46, supplies the ventilation inlet air to the gas turbine enclosure 14. To this extent, the clear air duct 46 receives the filtered intake air 44 from the last filter stage (e.g., Filter Stage 3) of the air filter house 42, which the combustion inlet air duct 48 provides as combustion inlet air to the compressor 26, and the ventilation inlet air bypass conduit 62 supplies as ventilation inlet air into the gas turbine enclosure 14.

For purposes of explaining the various embodiments, the air intake system 16 depicted in FIG. 2 is only illustrative of certain components that can form the air intake of a gas turbine system. It is understood that the air intake system 16 may include other components. Other examples of components that may be part of the air intake system may include, but are not limited to, an inlet screen, a plenum chamber assembly, and a silencer assembly. For example, an inlet screen may be positioned upstream of the air filter house 42, about the inlet that receives the intake air 44, to remove and/or filter out large particles and/or debris, while a silencer assembly formed from a plurality of silencer panels can be located downstream of the air filter house 42, about the clear air duct 46 to reduce the "noise" associated with the intake air 44 transmitted through the air intake system 16.

As shown in FIG. 2, the gas turbine enclosure ventilation exhaust system 20 can include one or more ventilation fans 50 to generate an air flow to purge the gas turbine enclosure 14 of heat and exhaust products from the gas turbine engine 12. A ventilation conduit 52, in fluid communication with each fan 50, can draw the air flow from the gas turbine enclosure 14 and direct it to a ventilation air control damper 54 as ventilation outlet air. The ventilation air control damper 54, which can be an electronically control device, can direct the ventilation outlet air from the gas turbine enclosure 14 to ambient and/or to one or more air inlet heating ducts 56 in fluid communication with a corresponding ventilation conduit 52. With this configuration, the gas turbine enclosure ventilation exhaust system 20 can use the air flow from the gas turbine enclosure 14 for purposes of preventing icing or heating the air intake system 16 when the ambient air temperature about the air intake system 16 reaches temperatures in which icing can occur, or to heat the enclosure in colder ambient conditions.

As shown in FIG. 2, the air intake system 16 can include a header or manifold 58 that receives the heated air from the gas turbine enclosure ventilation exhaust system 20 via the air inlet heating ducts 56 and distributes the heated air into the flow of intake air 44 entering the air filter house 42. In this manner, the heated air distributed by the header 58 into the intake air 44, increases the temperature of the intake air, thereby providing heat to the air filter house 42, which prevents any ice formation therein that can lead to ice debris and turbine blade damage, as well as a loss of performance if not mitigated.

In one embodiment, the header 58 can include a multiple of ventilation air dispersion nozzles 60 to distribute the heated air from the gas turbine enclosure ventilation exhaust system 20 via the air inlet heating ducts 56 into the flow of intake air 44. To this extent, the multiple ventilation air dispersion nozzles 60 can distribute the heated air into the flow of intake air 44 in a broad pattern. It is understood that the ventilation air dispersion nozzles 60 is one type of distribution pipes that can be used to inject the heated air from the air inlet heating ducts 56 into the flow of intake air 44, and is not meant to be limiting.

The system 22 of FIG. 2 includes a controller 64 that is operatively coupled with the valves (Valve 1 and Valve 2) associated with the low pressure recoup air piping 24, the ventilation air control damper 54, and the ventilation fans 50. In this manner, the controller 64 can control the operation of Valve 1, Valve 2, the ventilation air control damper 54, and the ventilation fans 50 as a function of one or more conditions detected about the gas turbine engine 12, the air intake system 16, and the gas turbine enclosure ventilation exhaust system 20. For example, one or more sensors may be disposed about the gas turbine engine 12, the air intake system 16, and the gas turbine enclosure ventilation exhaust system 20 to detect any of a number of conditions. The sensors can be in communication with the controller 64 to provide measurements representative of any number of parameters that the sensors are configured to detect.

In one embodiment, one or more temperature sensors can be disposed about the air intake system 16 to obtain temperature measurements about the air intake system. As shown in FIG. 2, an ambient temperature sensor T0 can be disposed about the inlet of the air intake system 16, while an air intake system temperature sensor T2 can be disposed within the air intake system. To this extent, the ambient temperature sensor T0 can obtain ambient temperature measurements about the inlet of the air intake system 16, while the air intake system temperature sensor T2 can obtain temperature measurements within the air intake system. In one embodiment, the air intake system temperature sensor T2 can be disposed about the combustion inlet air duct 48. It is understood that temperature sensors can be placed in different locations within the air intake system 16, or alternatively in other locations within the air intake system in addition to temperature sensors T0 and T2. Furthermore, it is understood that temperature sensors can be disposed in other locations in addition to those mentioned for the air intake system 16. For example, temperature sensors can be disposed in the gas turbine engine 12, the gas turbine enclosure 14 and the gas turbine enclosure ventilation exhaust system 20.

Although the various embodiments are described with respect to temperature measurements, it is understood that a multiple of other types of sensors can be deployed about the gas turbine engine 12, the gas turbine enclosure 14, the air intake system 16, and the gas turbine enclosure ventilation exhaust system 20. For example, a non-limiting list of sensors that are suitable for use with the gas turbine engine 12, the gas turbine enclosure 14, the air intake system 16, and the gas turbine enclosure ventilation exhaust system 20 include pressure sensors, flow sensors, and humidity sensors.

In one embodiment, the controller 64 can automatically control the flow of the low pressure recoup air from the low pressure recoup air piping 24 to the gas turbine combustion exhaust 18 and/or the gas turbine enclosure 14 and eventually the air intake system 16 as a function of a first temperature measurement representative of ambient temperature about the air intake system 16 obtained by temperature sensor T0, a second temperature measurement obtained within the air intake system by the air intake temperature sensor T2, and a predetermined temperature requirement having an ambient temperature constraint and an air intake system temperature differential constraint. For example, the controller 64 can control the flow of the low pressure recoup air from the low pressure recoup air piping 24 to the gas turbine combustion exhaust 18 and/or the air intake system 16 based on values of the first temperature measurement and the second temperature measurement in relation to satisfying the ambient temperature constraint and the air intake system temperature differential constraint.

In one embodiment, the ambient temperature constraint can include an ambient temperature that is less than about 40 degrees Fahrenheit (F), and the air intake system temperature differential constraint can include a temperature difference between 40 degrees F. and an instant second temperature measurement obtained at T2 or a 10 degree F. increase from the instant second temperature measurement, whichever is lower. Further details of the control of the valving (Valve 1 and Valve 2) associated with the low pressure recoup air piping 24 to control the flow of the low pressure recoup air, as well as the control of the ventilation air control damper 54 to heat the air intake system 16, as a function of the predetermined temperature requirement is discussed below.

FIG. 4 shows a schematic block diagram of the system 22 depicted in FIG. 2 with further details of the control logic of the controller 64 that can control the low pressure recoup air vented from the gas turbine engine 12 by the low pressure recoup air piping 24 according to an embodiment of the invention. As mentioned above, the controller 64 can automatically control the flow of the low pressure recoup air in the low pressure recoup air piping 24 to the gas turbine combustion exhaust 18 and/or the gas turbine enclosure 14. To this extent, the controller 64 can use the flow of the low pressure recoup air in the low pressure recoup air piping 24 to aid in heating the air intake system 16 for purposes of preventing icing when the ambient temperatures about the gas turbine engine 12 are prone to icing and subsequent performance issues and other issues including, but not limited to, damage of gas turbine engine components. In particular, controller 64 can use ambient temperature measurements (T0) located about the air intake system 16, and air intake system temperature measurements (T2), along with the aforementioned predetermined temperature requirement to control how the air intake system 16 is heated to remove or mitigate the icing conditions. For example, the controller 64 can use the heated air from the gas turbine enclosure ventilation exhaust system 20 to heat the air intake system 16 according to the underlying objective associated with the predetermined temperature requirement. If the use of the heated air from the gas turbine enclosure ventilation exhaust system 20 is inadequate to satisfy the predetermined temperature requirement, then the controller 64 can modulate the valving (Valve 1 and Valve 2) associated with the low pressure recoup air piping 24 to divert the low pressure recoup air into the gas turbine enclosure 14, which can increase the temperature of the air ventilated from the enclosure by the gas turbine enclosure ventilation exhaust system, thereby increasing the heated air provided to the air intake system 16. To this extent, the controller 64 can continue modulating Valve 1 and Valve 2 until the objective of the predetermined temperature requirement is satisfied. The controller 64 can then maintain the Valve 1, the Valve 2 and the ventilation air control damper 54 at the positions that led to the satisfaction of the predetermined temperature requirement. When controller 64 senses an improvement in ambient temperature as measured by T0, then the controller can slowly revert the Valve 1, Valve 2 and the ventilation air control damper 54 back to their original positions. As used herein, an "improvement in ambient temperature" means temperature above 40 degrees F., where icing temperatures begin.

FIG. 4 shows a schematic representation of the control logic that the controller 64 can use to perform the above-described operations. As used herein, the control logic refers to the instructions stored on a non-transitory tangible computer readable medium that enable the controller 64 to perform the various operations associated with controlling the gas turbine engine 12, air intake system 16 and the gas turbine enclosure ventilation exhaust system 20 and their respective components. As shown in FIG. 4, the controller 64 can include turbine operation logic 66, low pressure recoup piping logic 68, and ventilation logic 70.

In one embodiment, the turbine operation logic 66 can include, logic that is configured to control the general operation of the gas turbine engine 12, For example, the turbine operation logic 66 can include logic that is configured to control a startup procedure, normal operation procedure, and a shutdown procedure of the gas turbine engine 12.

The low pressure recoup piping logic 68 can include logic that is configured to control the opening and closing of the valving (Valve 1 and Valve 2) associated with the low pressure recoup piping 24. For example, this logic can include modulating (gradually opening or dosing) Valve 1 and Valve 2 between fully opened (100%) and fully dosed (0)%) positions.

The ventilation logic 70 can include logic that is configured to control the positioning of the ventilation air control damper 54. For example, this logic can include modulating (gradually opening or dosing) the ventilation air control damper 54 between positions that fully direct the heated air from the gas turbine enclosure 14 to ambient, to positions that fully direct the heated air from the gas turbine enclosure 14 into the air inlet heating ducts 56 and the air intake system 16, to positions that divert the heated air to both ambient and the air intake system. The ventilation logic 70 can include other logic that is directed to other operations performed by the gas turbine enclosure ventilation exhaust system 20. For example, the ventilation logic 70 can include logic configured to activate the one or more ventilation fans 50 to purge the gas turbine enclosure 14, as well as logic configured to deactivate the one or more ventilation fans 50 after a purge operation.

In certain embodiments, the controller 64 may be coupled to one or more actuators or drives, which in turn, can be coupled to the Valve V1, the Valve V2, and the ventilation air control damper 54. To this extent, the actuators or drives can be configured to drive the Valve V1, the Valve V2, and the ventilation air control damper 54 to positions that correspond with the positions dictated by the corresponding control logic.

It is understood that the logic depicted in FIG. 4 is representative of particular control logic utilized by the various embodiments to control the flow of the low pressure recoup air in the low pressure recoup air piping 24, including its use by the gas turbine enclosure ventilation exhaust system 20 to heat the air intake system 16 in temperatures in which icing conditions can exist, and its use to heat the gas turbine enclosure 14 in colder ambient conditions, Those skilled in the art will appreciate that the controller 64 can include other logic associated with other operations that are performed, and conditions that can arise while operating the gas turbine engine 12. Accordingly, the logic depicted in FIG. 4 is not meant to be limiting.

FIG. 5 shows a flow chart 72 describing the operations associated with the control logic of the controller depicted in FIG. 4, for controlling the flow of the low pressure recoup air from the low pressure recoup air piping 24 to the gas turbine combustion exhaust 18 and/or to the gas turbine enclosure 14 for eventual heating of the air intake system 16. The flow chart 72 of FIG. 5 starts at 74 where the T0 sensor obtains an ambient temperature measurement about the air intake system 16, and the T2 sensor obtains an air intake system temperature measurement within the air intake system. If the air intake system temperature measurement obtained by the T2 sensor is greater than about 40 degrees F. as determined at 76, then the controller 64 can direct the low pressure recoup air in the low pressure recoup air piping 24 to the gas turbine combustion exhaust 18, and the ventilated heated exhaust air from the gas turbine enclosure 14 to ambient at 78. In particular, the controller 64 can direct valve V1 to be 100% open and the valve V2 to be 0% open (i.e., closed) in order to direct the low pressure recoup air to the gas turbine combustion exhaust 18, while also directing the ventilation air control damper 54 to direct 100% of the ventilated heated exhaust air from the gas turbine enclosure 14 to ambient.

If the air intake system temperature measurement is less than about 40 degrees F. as determined at 76, then the controller 64 will direct the gas turbine enclosure ventilation exhaust system 20 to modulate the ventilation air control damper 54 at 80 to direct the gas turbine enclosure ventilation exhaust air towards the air inlet heating ducts 56 and the air intake system 16. This includes moving the ventilation air control damper 54 from a position that moves 0% of the gas turbine enclosure ventilation exhaust air to the air intake system 16 via the air inlet heating ducts 56, to a position that moves 100% of the gas turbine enclosure ventilation exhaust air to air filter house 42 of the air intake system 16.

The controller 64 can then monitor the effect that modulating the ventilation air control damper 54 from a position that moves 0% of the gas turbine enclosure ventilation exhaust air to the air intake system 16 to a position that moves 100% of the gas turbine enclosure ventilation exhaust air to the air intake system 16 by obtaining additional ambient temperature measurements about the air intake system and temperature measurements within the air intake system. As shown in FIG. 5, the controller 64 monitors temperature measurements from the T0 and T2 sensors at 82.

In particular, the control logic of the controller 64 will compare these temperature measurements to the temperature constraint and the air intake system temperature differential constraint of the predetermined temperature requirement. As mentioned above, the temperature constraint comprises an ambient temperature that is less than about 40 degrees F., and the air intake system temperature differential constraint comprises a temperature difference between 40 degrees F. and the air intake system temperature measurement, or a 10 degree F. increase or rise from the air intake system temperature measurement, whichever is lower. For example, if an instant air intake system temperature measurement is 32 degrees F., then an 8 degrees F. rise (e.g., in the air intake system) would be necessary to satisfy the underlying objective of the air intake system temperature differential constraint (i.e., the 8 degrees F. rise from 32 degrees F. to 40 degrees F. Is less than a 10 degrees F. rise or increase from 32 degrees F. reading). In another example, if an instant air intake system temperature measurement is 15 degrees F., then a 10 degrees F. rise to 25 degrees F. would satisfy the objective of the air intake system temperature differential constraint (i.e., the 10 degrees F. rise to 25 degrees is less than the 15 degrees F. from 25 degrees F. to 40 degrees F.).

Continuing with the flow chart 72 of FIG. 5, if it is determined at 84 that the air intake system temperature differential constraint is satisfied, then then the controller 64 can direct the low pressure recoup air in the low pressure recoup air piping 24 to the gas turbine combustion exhaust 18, and the ventilated heated exhaust air from the gas turbine enclosure 14 to ambient at 78. As mentioned above, this can include the controller 64 directing valve V1 to be 100% open and the valve V2 to be 0% open in order to direct the low pressure recoup air to the gas turbine combustion exhaust 18, and directing the ventilation air control damper 54 to direct 100% of the ventilated heated exhaust air from the gas turbine enclosure 14 to ambient.

Alternatively, if it is determined at 84 that the air intake system temperature differential constraint is not satisfied, then the controller 64 can modulate valve V2 at 86 to achieve the underlying objective of the air intake system temperature differential constraint. In particular, the controller 64 can gradually open the Valve V2 associated with the low pressure recoup air piping 24 to move it from a position in which Valve V2 is 0% open, to a position that is 100% open in order to divert a portion of the flow of the low pressure recoup air to the gas turbine enclosure. To this extent, the gas turbine enclosure ventilation exhaust system 20 can use the ventilation exhaust air from the gas turbine enclosure 14, that will now include the diverted low pressure recoup air, and direct it to the air intake system 16 via the air inlet heating ducts 56. As a result, the heat from the gas turbine enclosure ventilation exhaust air and the low pressure recoup air will heat the ambient air entering into the air intake system 16 via the air filter house 42.

If the air intake system temperature differential constraint still not met as determined at 88, then the controller 64 can modulate or gradually close the Valve V1 associated with the low pressure recoup air piping at 90 to be 0% open. To this extent, the temperature of the ventilation exhaust air from the gas turbine enclosure 14 should increase because no flow of the low pressure recoup air is being directed out to ambient through the gas turbine combustion exhaust 18. As a result, the increased heat from the gas turbine enclosure ventilation exhaust air will provide more heat to the ambient air entering into the air intake system 16 via the air filter house 42.

Once the underlying objective of the air intake system temperature differential constraint has been satisfied, then essentially the temperature at the air intake system 16 is no longer conducive to icing conditions that can cause damage to components of the air intake system 16 and the gas turbine engine 12, as well as diminish performance of the gas turbine system, since the temperatures that can lead to icing conditions and their concomitant problems have been mitigated. To this extent, once it is ascertained that the ambient temperature as measured by the ambient temperature sensor T0 is greater than 40 degrees F., then the controller 64 will modulate Valves V1 and V2 and the ventilation air control damper 54 to slowly revert back to their original positions (Valve 1—100% open, Valve 2—0% open, and damper directing 100% to ambient) at 92. At this point, the controller 64 can direct the low pressure recoup air piping 24 to supply the low pressure recoup air to the gas turbine combustion exhaust 18, and the ventilation air control damper 54 to direct the gas turbine enclosure ventilation exhaust air to ambient.

Accordingly, the algorithm embodied by the flow chart 72 depicted in FIG. 5 is amenable for industrial application in that it relates to the technical field of gas turbine systems and presents a solution to a technical problem that temperatures that lead to icing conditions can have on the operation and performance of various components including, but not limited to, the air intake system and the gas turbine engine. As a result, the algorithm embodied by the flow chart 72 of FIG. 5 can be used for preventing icing in the air intake system 16, including components such as the air filter house 42, in response to the existence of temperatures in which icing can occur. In this manner, the heat from the gas turbine enclosure ventilation exhaust air and/or the diverted low pressure recoup air can heat the air intake system 16 to a temperature that satisfies a predetermined temperature requirement that fulfills an anti-icing objective.

Basically, the low pressure recoup air is vented into the gas turbine enclosure 14 at cold ambient conditions, and the gas turbine enclosure ventilation exhaust system 20 can use this to supplement the heat in the enclosure from the exhaust products of the gas turbine engine 12 and enclosure for preventing icing in the inlet region of the air intake system 16. In addition, even if icing conditions are not prevalent, the algorithm can be used to heat the gas turbine enclosure 14 in colder ambient conditions When icing and colder ambient conditions are not issues, the low pressure recoup piping can direct the low pressure recoup air to the gas turbine combustion exhaust 18, and the gas turbine enclosure ventilation exhaust air can be directed to ambient. With the approach described herein, the amount of heated air in the gas turbine enclosure 14 and the gas turbine combustion exhaust 18 can be automatically controlled based on need.

While, for purposes of simplicity of explanation, the operations shown in FIG. 5 are described as a series of acts. It is to be understood and appreciated that the subject innovation associated with FIG. 5 is not limited by the order of acts, as some acts may, in accordance therewith, occur in a different order and/or concurrently with other acts from that shown and described herein. For example, those skilled in the art will understand and appreciate that a methodology or operations depicted in FIG. 5 could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

It is understood that the system depicted in FIGS. 1, 2 and 4 may include the necessary electronics, software, memory, storage, databases, firmware, logic/state machines, microprocessors, communication links, displays or other visual or audio user interfaces, printing devices, and any other input/ output interfaces to perform the functions described herein and/or to achieve the results described herein, which may be accomplished in real-time. For example, the controller 64 depicted in FIGS. 2 and 4 may include at least one processor and system memory/data storage structures, which may include random access memory (RAM) and read-only memory (ROM). The at least one processor of the controller 64 may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controller 64 to perform the operations disclosed herein may be read into a main memory of the at least one processor from a computer-readable medium. The term "computer-readable medium," as used herein, refers to any medium that provides or participates in providing instructions to the at least one processor of the controller 64 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random-access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present invention are not intended to be interpreted as excluding the existence of additional embodiments that also incorporate the recited features.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A system for controlling low pressure recoup air vented from a gas turbine engine disposed in a gas turbine enclosure with low pressure recoup air piping coupled to a gas turbine combustion exhaust located outside of the enclosure and an air intake system to provide air to the gas turbine engine for combustion, comprising: a first valve operatively coupled to the low pressure recoup air piping to control a flow of the low pressure recoup air to the gas turbine combustion exhaust; a second valve operatively coupled to the low pressure recoup air piping for diverting the low pressure recoup air to the gas turbine enclosure; and a controller operatively coupled to the first valve and the second valve to automatically control the flow of the low pressure recoup air from the low pressure recoup air piping to the gas turbine combustion exhaust and/or the gas turbine enclosure as a function of a first temperature measurement representative of ambient temperature about the air intake system, a second temperature measurement obtained within the air intake system, and a predetermined temperature requirement having an ambient temperature constraint and an air intake system temperature differential constraint.

The system of the preceding clause, further comprising at least one low pressure recoup dispersion nozzle operatively coupled to the second valve and the gas turbine enclosure, wherein the at least one low pressure recoup dispersion nozzle is configured to broadly disperse the low pressure recoup air diverted from the low pressure recoup air piping into the gas turbine enclosure.

The system of any of the preceding clauses, wherein the ambient temperature constraint comprises an ambient temperature less than about 40 degrees Fahrenheit (F), and the air intake system temperature differential constraint comprises a temperature difference between 40 degrees F. and an instant second temperature measurement or a 10 degree F. increase from the instant second temperature measurement, whichever is lower.

A system, comprising: a gas turbine enclosure; a gas turbine engine disposed in the gas turbine enclosure; an air intake system operatively coupled to the gas turbine enclosure to direct air to the gas turbine engine, wherein the air intake system includes an air filter house to filter the air directed to the gas turbine engine; a gas turbine combustion exhaust operatively coupled to the gas turbine engine to output an exhaust flow generated from the gas turbine engine outside of the gas turbine enclosure; low pressure recoup air piping operatively coupled to the gas turbine engine, the gas turbine enclosure and the gas turbine combustion exhaust to provide low pressure recoup air vented from the gas turbine engine to the gas turbine combustion exhaust and/or the gas turbine enclosure; a first valve operatively coupled to the low pressure recoup air piping to control a flow of the low pressure recoup air to the gas turbine combustion exhaust; a second valve operatively coupled to the low pressure recoup air piping for diverting the low pressure recoup air from the low pressure recoup air piping to the gas turbine enclosure; and a controller operatively coupled to the first valve and the second valve to control the flow of the low pressure recoup air from the low pressure recoup air piping to the gas turbine combustion exhaust and/or the gas turbine enclosure, wherein the controller includes control logic configured to control the flow of the low pressure recoup air as a function of an ambient temperature measurement obtained about the air intake system, an air intake system temperature measurement obtained within the air intake system, and a predetermined temperature requirement having an ambient temperature constraint and an air intake system temperature differential constraint, wherein the control logic is configured to control the flow of the low pressure recoup air from the low pressure recoup air piping to the gas turbine combustion exhaust and/or the gas turbine enclosure based on values of the ambient temperature measurement and the air intake system temperature measurement in relation to satisfying the ambient temperature constraint and the combustion air intake system temperature differential constraint.

The system of the preceding clause, wherein the control logic is configured to control the first valve and the second valve to direct the flow of the low pressure recoup air from the low pressure recoup air piping to the gas turbine combustion exhaust in response to the air intake system temperature measurement satisfying the ambient temperature constraint.

The system of any of the preceding clauses, wherein the control logic is configured to control the first valve and the second valve to direct at least a portion of the flow of the low pressure recoup air to the gas turbine enclosure in response to determining that the air intake system temperature measurement fails to satisfy both the ambient temperature constraint and the combustion air intake system temperature differential constraint.

The system of any of the preceding clauses, wherein the control logic is configured to modulate the second valve from a 0% open position to a 100% open position in order to satisfy the combustion air intake system temperature differential constraint.

The system of any of the preceding clauses, wherein the control logic is configured to modulate the first valve from a 100% open position to a 0% open position in order to satisfy the combustion air intake system temperature differential constraint.

The system of any of the preceding clauses, wherein the control logic is configured to control the first valve and the second valve to gradually direct the flow of the low pressure recoup air away from the gas turbine enclosure and towards the gas turbine combustion exhaust in response to ascertaining that the ambient temperature measurement satisfies the predetermined ambient temperature threshold.

The system of any of the preceding clauses, further comprising: a gas turbine enclosure ventilation exhaust system, operatively coupled to the air intake system, the gas turbine engine and the gas turbine enclosure, to purge and ventilate heat and exhaust products from the gas turbine engine, wherein the gas turbine enclosure ventilation exhaust system includes a ventilation air control damper configured to direct ventilation outlet air from the gas turbine enclosure: to ambient and/or to the air filter house.

The system of any of the preceding clauses, further comprising: wherein the control logic is configured to control a flow of the ventilation outlet air to ambient and/or to the air filter house.

The system of any of the preceding clauses, wherein the control logic is configured to control the flow of the ventilation outlet air to ambient and/or to the air filter house as a function of the ambient temperature measurement, the air intake system temperature measurement, and the predetermined temperature requirement.

The system of any of the preceding clauses, wherein the control logic is configured to direct one or more of the ventilation outlet air from the gas turbine enclosure ventilation exhaust system and the low pressure recoup air from the gas turbine enclosure to the air filter house to achieve satisfaction of the air intake system temperature differential constraint and the predetermined temperature requirement.

The system of any of the preceding clauses, wherein the control logic is configured to gradually control operation of the first valve, the second valve and the ventilation air control damper to revert back to original operating positions in response to determining an improvement in ambient temperature in relation to the ambient temperature constraint.

The system of any of the preceding clauses, further comprising at least one low pressure recoup dispersion nozzle operatively coupled to the second valve and the gas turbine enclosure, wherein the at least one low pressure recoup dispersion nozzle is configured to broadly disperse the low pressure recoup air from the low pressure recoup air piping into the gas turbine enclosure.

The system of any of the preceding clauses, wherein the ambient temperature constraint comprises an ambient temperature less than about 40 degrees Fahrenheit (F), and the air intake system temperature differential constraint comprises a temperature difference between 40 degrees F. and an instant air intake system temperature measurement or a 10 degree F. increase from the instant air intake system temperature measurement, whichever is lower.

The system of any of the preceding clauses, wherein the gas turbine engine comprises an aeroderivative gas turbine.

A method for controlling low pressure recoup air vented from a gas turbine engine disposed in a gas turbine enclosure with low pressure recoup air piping coupled to a gas turbine combustion exhaust located outside of the enclosure, an air intake system to provide air to the gas turbine engine for combustion, and a gas turbine enclosure ventilation exhaust system to purge and ventilate heat and exhaust products from the gas turbine engine, the method comprising: configuring a first valve to operate cooperatively with the low pressure recoup air piping to control a flow of the low pressure recoup air to the gas turbine combustion exhaust; configuring a second valve to operate cooperatively with the low pressure recoup air piping for diverting the low pressure recoup air from the low pressure recoup air piping to the gas turbine enclosure; obtaining an ambient temperature measurement about the air intake system; obtaining an air intake system temperature measurement from within the air intake system; and controlling the flow of the low pressure recoup air from the low pressure recoup air piping to the gas turbine combustion exhaust and/or the gas turbine enclosure as a function of the ambient temperature measurement, the air intake temperature measurement, and a predetermined temperature requirement having an ambient temperature constraint and an air intake temperature differential constraint, wherein the controlling of the flow of the low pressure recoup air from the low pressure recoup air piping to the gas turbine combustion exhaust and/or the gas turbine enclosure is based on values of the ambient temperature measurement and the air intake system temperature measurement in relation to satisfying the ambient temperature constraint and the gas turbine engine temperature differential constraint.

The method of the preceding clause, further comprising controlling a flow of ventilation outlet air from the gas turbine enclosure ventilation exhaust system to ambient and/or to the air intake system.

The method of any of the preceding clauses, wherein the controlling of the flow of ventilation outlet air from the gas turbine enclosure ventilation exhaust system to ambient and/or to the air intake system is a function of the ambient temperature measurement and the air intake system temperature measurement satisfying the ambient temperature constraint and the gas turbine engine temperature differential constraint.

What is claimed is:

1. A system for controlling low pressure recoup air vented from a gas turbine engine disposed in a gas turbine enclosure with low pressure recoup air piping coupled to a gas turbine combustion exhaust located outside of the enclosure and an air intake system to provide air to the gas turbine engine for combustion, comprising:
    a first valve operatively coupled to the low pressure recoup air piping to control a flow of the low pressure recoup air to the gas turbine combustion exhaust;
    a second valve operatively coupled to the low pressure recoup air piping for diverting the low pressure recoup air to the gas turbine enclosure; and
    a controller operatively coupled to the first valve and the second valve to automatically control the flow of the low pressure recoup air from the low pressure recoup air piping to the gas turbine combustion exhaust and/or the gas turbine enclosure as a function of a first temperature measurement representative of ambient temperature about the air intake system, a second temperature measurement obtained within the air intake system, and a predetermined temperature requirement having an ambient temperature constraint and an air intake system temperature differential constraint.

2. The system according to claim 1, further comprising at least one low pressure recoup dispersion nozzle operatively coupled to the second valve and the gas turbine enclosure, wherein the at least one low pressure recoup dispersion nozzle is configured to broadly disperse the low pressure recoup air diverted from the low pressure recoup air piping into the gas turbine enclosure.

3. The system according to claim 1, wherein the ambient temperature constraint comprises an ambient temperature less than about 40 degrees Fahrenheit (F), and the air intake system temperature differential constraint comprises a temperature difference between 40 degrees F. and an instant second temperature measurement or a 10 degree F. increase from the instant second temperature measurement, whichever is lower.

4. A system, comprising:
    a gas turbine enclosure;
    a gas turbine engine disposed in the gas turbine enclosure;
    an air intake system operatively coupled to the gas turbine enclosure to direct air to the gas turbine engine, wherein the air intake system includes an air filter house to filter the air directed to the gas turbine engine;
    a gas turbine combustion exhaust operatively coupled to the gas turbine engine to output an exhaust flow generated from the gas turbine engine outside of the gas turbine enclosure;
    a low pressure recoup air piping operatively coupled to the gas turbine engine, the gas turbine enclosure and the gas turbine combustion exhaust to provide low pressure recoup air vented from the gas turbine engine to the gas turbine combustion exhaust and/or the gas turbine enclosure;
    a first valve operatively coupled to the low pressure recoup air piping to control a flow of the low pressure recoup air to the gas turbine combustion exhaust;

a second valve operatively coupled to the low pressure recoup air piping for diverting the low pressure recoup air from the low pressure recoup air piping to the gas turbine enclosure; and a controller operatively coupled to the first valve and the second valve to control the flow of the low pressure recoup air from the low pressure recoup air piping to the gas turbine combustion exhaust and/or the gas turbine enclosure, wherein the controller includes control logic configured to control the flow of the low pressure recoup air as a function of an ambient temperature measurement obtained about the air intake system, an air intake system temperature measurement obtained within the air intake system, and a predetermined temperature requirement having an ambient temperature constraint and an air intake system temperature differential constraint, wherein the control logic is configured to control the flow of the low pressure recoup air from the low pressure recoup air piping to the gas turbine combustion exhaust and/or the gas turbine enclosure based on values of the ambient temperature measurement and the air intake system temperature measurement in relation to satisfying the ambient temperature constraint and the combustion air intake system temperature differential constraint.

5. The system according to claim 4, wherein the control logic is configured to control the first valve and the second valve to direct the flow of the low pressure recoup air from the low pressure recoup air piping to the gas turbine combustion exhaust in response to the air intake system temperature measurement satisfying the ambient temperature constraint.

6. The system according to claim 4, wherein the control logic is configured to control the first valve and the second valve to direct at least a portion of the flow of the low pressure recoup air to the gas turbine enclosure in response to determining that the air intake system temperature measurement fails to satisfy both the ambient temperature constraint and the combustion air intake system temperature differential constraint.

7. The system according to claim 6, wherein the control logic is configured to modulate the second valve from a 0% open position to a 100% open position in order to satisfy the combustion air intake system temperature differential constraint.

8. The system according to claim 7, wherein the control logic is configured to modulate the first valve from a 100% open position to a 0% open position in order to satisfy the combustion air intake system temperature differential constraint.

9. The system according to claim 8, wherein the control logic is configured to control the first valve and the second valve to gradually direct the flow of the low pressure recoup air away from the gas turbine enclosure and towards the gas turbine combustion exhaust in response to ascertaining that the ambient temperature measurement satisfies the predetermined ambient temperature threshold.

10. The system according to claim 4, further comprising:
a gas turbine enclosure ventilation exhaust system, operatively coupled to the air intake system, the gas turbine engine and the gas turbine enclosure, to purge and ventilate heat and exhaust products from the gas turbine engine, wherein the gas turbine enclosure ventilation exhaust system includes a ventilation air control damper configured to direct ventilation outlet air from the gas turbine enclosure to ambient and/or to the air filter house.

11. The system according to claim 10, wherein the control logic is configured to control a flow of the ventilation outlet air to ambient and/or to the air filter house.

12. The system according to claim 11, wherein the control logic is configured to control the flow of the ventilation outlet air to ambient and/or to the air filter house as a function of the ambient temperature measurement, the air intake system temperature measurement, and the predetermined temperature requirement.

13. The system according to claim 12, wherein the control logic is configured to direct one or more of the ventilation outlet air from the gas turbine enclosure ventilation exhaust system and the low pressure recoup air from the gas turbine enclosure to the air filter house to achieve satisfaction of the air intake system temperature differential constraint and the predetermined temperature requirement.

14. The system according to claim 13, wherein the control logic is configured to gradually control operation of the first valve, the second valve and the ventilation air control damper to revert back to original operating positions in response to determining an improvement in ambient temperature in relation to the ambient temperature constraint.

15. The system according to claim 4, further comprising at least one low pressure recoup dispersion nozzle operatively coupled to the second valve and the gas turbine enclosure, wherein the at least one low pressure recoup dispersion nozzle is configured to broadly disperse the low pressure recoup air from the low pressure recoup air piping into the gas turbine enclosure.

16. The system according to claim 4, wherein the ambient temperature constraint comprises an ambient temperature less than about 40 degrees Fahrenheit (F), and the air intake system temperature differential constraint comprises a temperature difference between 40 degrees F. and an instant air intake system temperature measurement or a 10 degree F. increase from the instant air intake system temperature measurement, whichever is lower.

17. The system according to claim 4, wherein the gas turbine engine comprises an aeroderivative gas turbine.

18. A method for controlling low pressure recoup air vented from a gas turbine engine disposed in a gas turbine enclosure with low pressure recoup air piping coupled to a gas turbine combustion exhaust located outside of the enclosure, an air intake system to provide air to the gas turbine engine for combustion, and a gas turbine enclosure ventilation exhaust system to purge and ventilate heat and exhaust products from the gas turbine engine, the method comprising:
configuring a first valve to operate cooperatively with the low pressure recoup air piping to control a flow of the low pressure recoup air to the gas turbine combustion exhaust;
configuring a second valve to operate cooperatively with the low pressure recoup air piping for diverting the low pressure recoup air from the low pressure recoup air piping to the gas turbine enclosure;
obtaining an ambient temperature measurement about the air intake system;
obtaining an air intake system temperature measurement from within the air intake system; and
controlling the flow of the low pressure recoup air from the low pressure recoup air piping to the gas turbine combustion exhaust and/or the gas turbine enclosure as a function of the ambient temperature measurement, the air intake temperature measurement, and a predetermined temperature requirement having an ambient temperature constraint and an air intake temperature differential constraint, wherein the controlling of the flow of the low pressure recoup air from the low pressure recoup air piping to the gas turbine combustion exhaust and/or the gas turbine enclosure is based on values of the ambient temperature measurement and the air intake system temperature measurement in relation to satisfying the ambient temperature constraint and the gas turbine engine temperature differential constraint.

19. The method according to claim 18, further comprising controlling a flow of ventilation outlet air from the gas turbine enclosure ventilation exhaust system to ambient and/or to the air intake system.

20. The method according to claim 19, wherein the controlling of the flow of ventilation outlet air from the gas turbine enclosure ventilation exhaust system to ambient and/or to the air intake system is a function of the ambient temperature measurement and the air intake system temperature measurement satisfying the ambient temperature constraint and the gas turbine engine temperature differential constraint.

* * * * *